(12) United States Patent
Yun et al.

(10) Patent No.: US 7,375,790 B2
(45) Date of Patent: May 20, 2008

(54) UPPER SUBSTRATE, LIQUID CRYSTAL DISPLAY APPARATUS HAVING THE SAME AND METHOD OF FABRICATING THE SAME

(75) Inventors: Young-Nam Yun, Seoul-si (KR); Jin-Suk Park, Seoul-si (KR)

(73) Assignee: Samsung Electronics Co., Ltd. (KR)

( * ) Notice: Subject to any disclaimer, the term of this patent is extended or adjusted under 35 U.S.C. 154(b) by 6 days.

(21) Appl. No.: 11/408,310

(22) Filed: Apr. 21, 2006

(65) Prior Publication Data

US 2006/0187401 A1    Aug. 24, 2006

Related U.S. Application Data

(63) Continuation of application No. 10/448,606, filed on May 29, 2003, now Pat. No. 7,061,569.

(30) Foreign Application Priority Data

Jul. 26, 2002 (KR) ............... 2002-44271
Aug. 21, 2002 (KR) ............... 2002-49580

(51) Int. Cl.
*G02F 1/1339* (2006.01)
(52) U.S. Cl. .................... 349/156; 349/153
(58) Field of Classification Search ............ 349/156, 349/153
See application file for complete search history.

(56) References Cited

U.S. PATENT DOCUMENTS 6,163,357 A    12/2000    Nakamura ........... 349/155
6,304,308 B1   10/2001    Saito et al. ........... 349/155
6,323,921 B1 * 11/2001   Kurauchi et al. ....... 349/106
6,593,990 B1    7/2003    Yamazaki ............. 349/138
6,705,584 B2    3/2004    Hiroshima et al. ..... 249/155

FOREIGN PATENT DOCUMENTS

| EP | 0 867 750 A2 | 9/1998 |
| EP | 1 076 257 A2 | 2/2001 |
| JP | 10186406 | 7/1998 |
| JP | 2000284325 | 10/2000 |

OTHER PUBLICATIONS

PCT International Search Report for Application No. PCT/KR03/01046; International filing date of May 28, 2003; Mailing date of Sep. 25, 2003.
Korean Office Action Jul. 31, 2007. All references cited in the Office action and not previously submitted are listed above.

* cited by examiner

*Primary Examiner*—David Nelms
*Assistant Examiner*—David Y. Chung
(74) *Attorney, Agent, or Firm*—Cantor Colburn LLP

(57) ABSTRACT

An upper substrate, LCD apparatus and method of fabricating the same capable of reducing misoperations are provided. The LCD apparatus includes an upper substrate having a cell gap maintaining member, a lower substrate having a display are and a driving area adjacent to the display area, for providing a driving signal to the display area, and a liquid crystal layer disposed between the upper and lower substrates. The cell gap maintaining member includes a first layer, for separating the color filter substrate from the array substrate, disposed between the upper and lower substrates corresponding to the display area, and a second layer, for protecting driving circuits of the LCD apparatus, disposed corresponding to the driving area and shorter than the first layer.

16 Claims, 17 Drawing Sheets

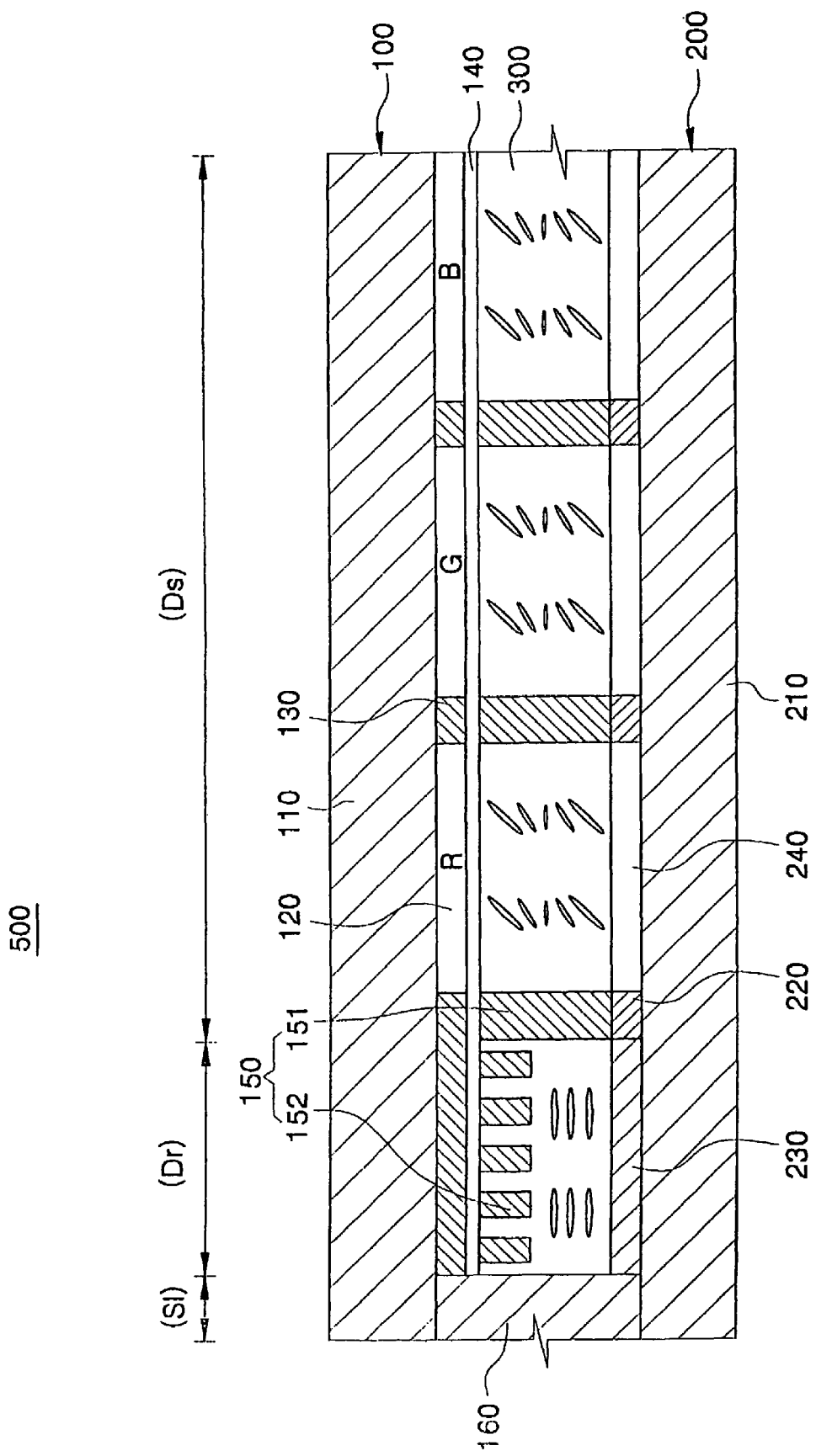

FIG. 5C
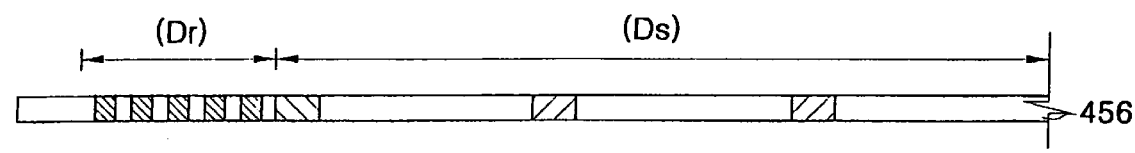
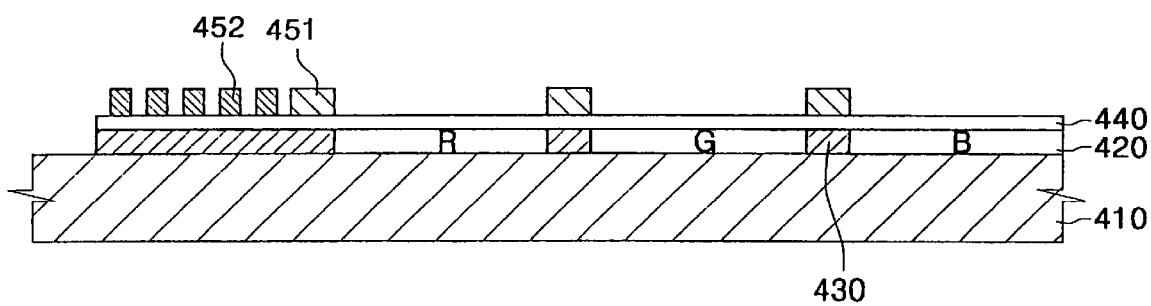
FIG. 5D
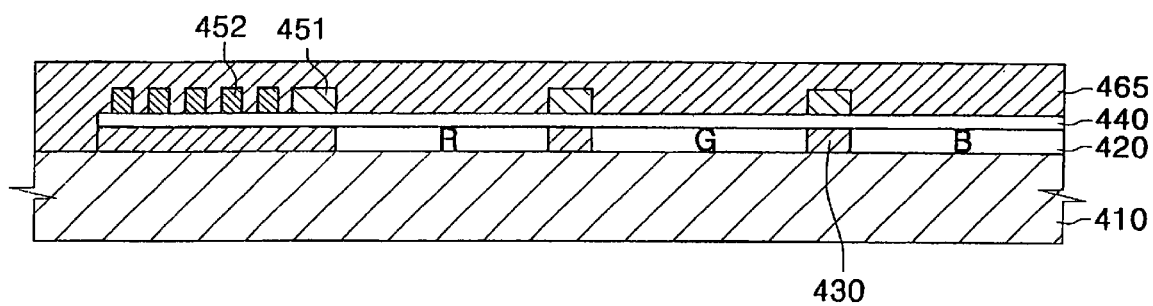

UPPER SUBSTRATE, LIQUID CRYSTAL DISPLAY APPARATUS HAVING THE SAME AND METHOD OF FABRICATING THE SAME

CROSS REFERENCE TO RELATED APPLICATIONS

This application is a continuation application of U.S. application Ser. No. 10/448,606 filed May 29, 2003 now U.S. Pat. No. 7,061,569, which claims priority to and the benefit of Korean Patent Application No. 2002-0044271 filed on Jul. 26, 2002 and Korean Patent Application No. 2002-0049580 filed on Aug. 21, 2002, all of which are incorporated by reference herein in their entirety.

BACKGROUND OF THE INVENTION

1. Field of the Invention

The present invention relates to an upper substrate, an LCD (Liquid Crystal Display) apparatus having the same and a method of fabricating the same, and more particularly to an upper substrate for reducing misoperations, an LCD apparatus having the same and a method of fabricating the same.

2. Description of the Related Art

Information processing devices have been developed to include various shapes and functions with rapid data processing speed. The information processing devices include an interface such as a display device for displaying information processed in the form of an electric signal.

LCD apparatuses having a light weight and a compact size, as compared with a CRT type display device, have been developed to achieve full-color and high-resolution functions.

The LCD apparatus includes an LCD panel for displaying an image and a backlight assembly for providing light to the LCD panel, which is disposed under the LCD panel.

The LCD panel includes a color filter substrate, an array substrate and a liquid crystal molecules interposed between the color filter and array substrates. The LCD panel changes an arrangement of liquid crystal molecules by applying a voltage to the liquid crystal molecules and controls an amount of the light provided from the backlight assembly to display the image.

The color filter and array substrates are spaced from each other by a spacer disposed between the color filter and array substrates. The spacer maintains a gap between the color filter and array substrates to prevent the form of the liquid crystal molecules from being changed and properties of the LCD apparatus from being deteriorated.

The spacer is classified into a ball spacer having a ball shape and distributed over the color filter substrate or the array substrate and a rigid spacer disposed on the color filter substrate or the array substrate. The rigid spacer is formed by forming an organic layer on the color filter substrate or the array substrate and patterning the organic layer. The ball spacer is randomly distributed over the color filter substrate or the array substrate, so that the ball spacer may be disposed on an effective display area of the LCD apparatus. The randomly distributed ball spacer may cause a deterioration of an opening ratio (an effective display area/a total area) of the LCD apparatus and the LCD apparatus may have a non-uniform cell gap because a size of the ball spacer is not uniform.

On the contrary, since the rigid spacer is formed by removing the organic layer on the effective display area except a non-effective display area of the LCD apparatus, the opening ratio of the LCD apparatus may be not deteriorated and the LCD apparatus may have a uniform cell gap. Thus, the rigid spacer has been generally used to LCD apparatus.

Recently, the gate and data driving circuits disposed on the array substrate of the LCD panel are formed with a thin film process. In this case, the array substrate is divided into a display area on which a TFT is disposed and a driving area on which the gate and data driving circuits are disposed for driving the TFT. The spacer is disposed between the color filter substrate and the array substrate and may be disposed on only the display area or on the display and driving areas.

When an external force is applied to the LCD panel in which the spacer is disposed on only the display area, the color filter and array substrates may electrically come in contact with each other because a common electrode disposed on the color filter substrate makes contact with the gate and data driving circuits disposed on the array substrate.

Also, when the external impact is applied to the LCD panel in which the spacer is disposed on the display and driving areas, the spacer presses the gate and data driving circuits, so that circuits and wirings of the LCD panel may be damaged. As a result, the gate and data driving circuits may not provide driving signals to corresponding data and gate lines disposed on the LCD panel, thereby deteriorating a quality of the image displayed through the LCD panel.

BRIEF SUMMARY OF THE INVENTION

The present invention provides an upper substrate for reducing misoperations.

The present invention also provides an LCD apparatus having the upper substrate.

The present invention also provides a method of fabricating an LCD apparatus having the upper substrate.

In one aspect of the invention, there is provided an upper substrate for displaying an image using a liquid crystal interposed between the upper substrate and a lower substrate, comprising: a substrate; a transparent electrode disposed on the substrate; and a cell gap maintaining member comprising a first layer disposed on a first area of the transparent electrode corresponding to a display part of the array substrate, for separating the array substrate and the color filter substrate and a second layer disposed on a second area corresponding to the driving part between the upper and lower substrates, for protecting the driving part, the first layer being taller than the second layer.

In another aspect of the invention, there is provided an upper substrate for displaying an image using a liquid crystal interposed between the upper substrate and a lower substrate, comprising: a substrate; and a transparent electrode disposed on the substrate except a predetermined area of the substrate corresponding to a driving part of the array substrate, the driving part providing a driving signal to a display part of the lower substrate and being disposed at a peripheral area of the display part.

In further aspect of the invention, there is provided an LCD apparatus comprising: an upper substrate; a lower substrate comprising a display part and a driving part, the driving part providing a driving signal to the display part and being disposed at a peripheral area of the display part; a liquid crystal interposed between the upper substrate and the lower substrate; and a cell gap maintaining member comprising a first layer disposed on a first area corresponding to the display part between the upper and lower substrates, for separating the upper and lower substrates, and a second layer disposed on a second area corresponding to the driving part between the upper and lower substrates, for protecting the driving part, the first layer being taller than the second layer.

In still another aspect of the invention, there is provided an LCD apparatus comprising: a lower substrate comprising a display part on which a first transparent electrode is disposed and a driving part for providing a driving signal to the display part, the driving part being disposed at a peripheral area of the display part; an upper substrate comprising a second transparent electrode disposed on a substrate except a predetermined area of the substrate corresponding to the driving part; and a liquid crystal interposed between the upper substrate and the lower substrate.

In still another aspect of the invention, there is provided a method of fabricating an LCD apparatus, comprising: forming an upper substrate comprising a cell gap maintaining member including a first layer disposed on a first area and a second layer disposed on a second layer; forming a lower substrate comprising a display part corresponding to the first area and a driving part corresponding to the second area, the driving part providing a driving signal to the display part and being disposed at a peripheral area of the display part; combining the upper substrate with the lower substrate, the cell gap maintaining member being disposed between the upper and lower substrates; and interposing a liquid crystal layer between the upper and lower substrates.

In still another aspect of the invention, there is provided a method of fabricating an LCD apparatus, comprising: forming a lower substrate comprising a display part on which a first transparent electrode is disposed and a driving part for providing a driving signal to the display part, the driving part being disposed at a peripheral area of the display part; forming an upper substrate comprising a second transparent electrode disposed on the substrate except a first area corresponding to the driving part; combining the upper substrate and the lower substrate, the first and second transparent electrodes being faced to each other; and interposing a liquid crystal between the upper substrate and the lower substrate.

According to the invention, the first and second layers of the cell gap maintaining member, height of the layers being different from each other, are disposed between the upper substrate and the lower substrate, thereby reducing misoperations of the LCD apparatus.

BRIEF DESCRIPTION OF THE DRAWINGS

The above and other advantages of the present invention will become readily apparent by reference to the following detailed description when considered in conjunction with the accompanying drawings wherein:

FIG. 1 is a cross sectional view showing a structure of an LCD apparatus according to the present invention;

FIGS. 5A to 5G are sectional views showing a method of fabricating a color filter substrate according to another embodiment of the present invention;

DETAILED DESCRIPTION OF THE INVENTION

Figure 2A:
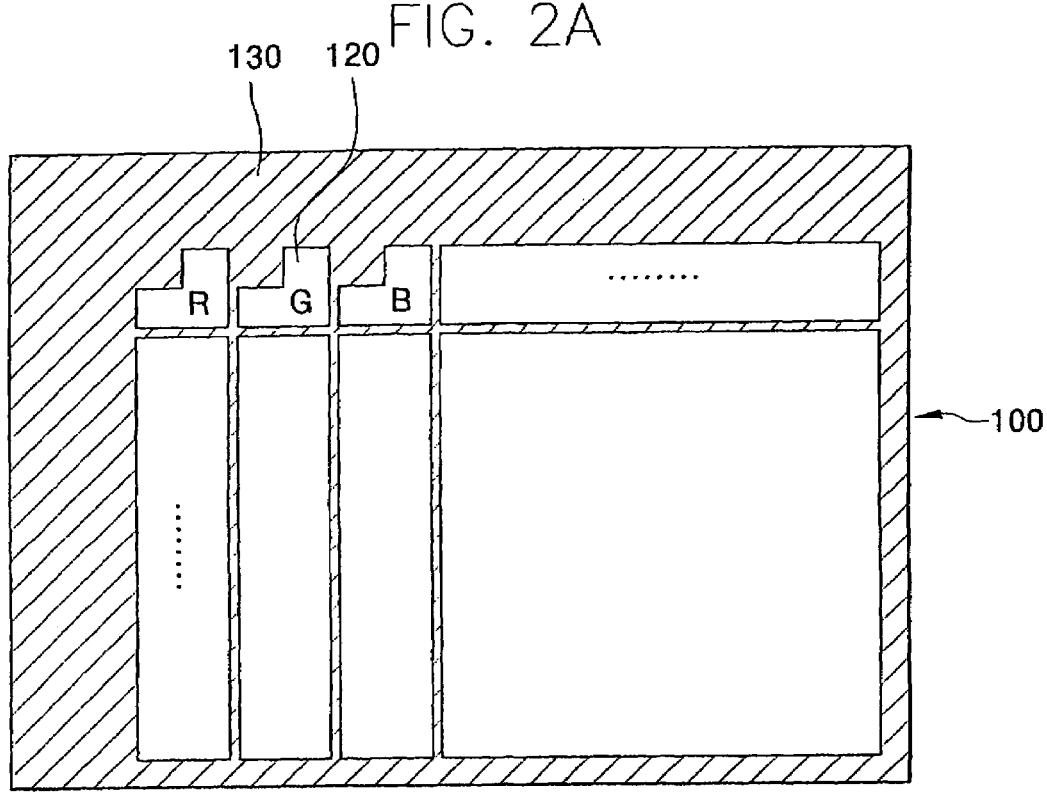
FIGS. 2A and 2B are plan views showing a structure of a color filter substrate and an array substrate shown in FIG. 1.
Figure 2B:
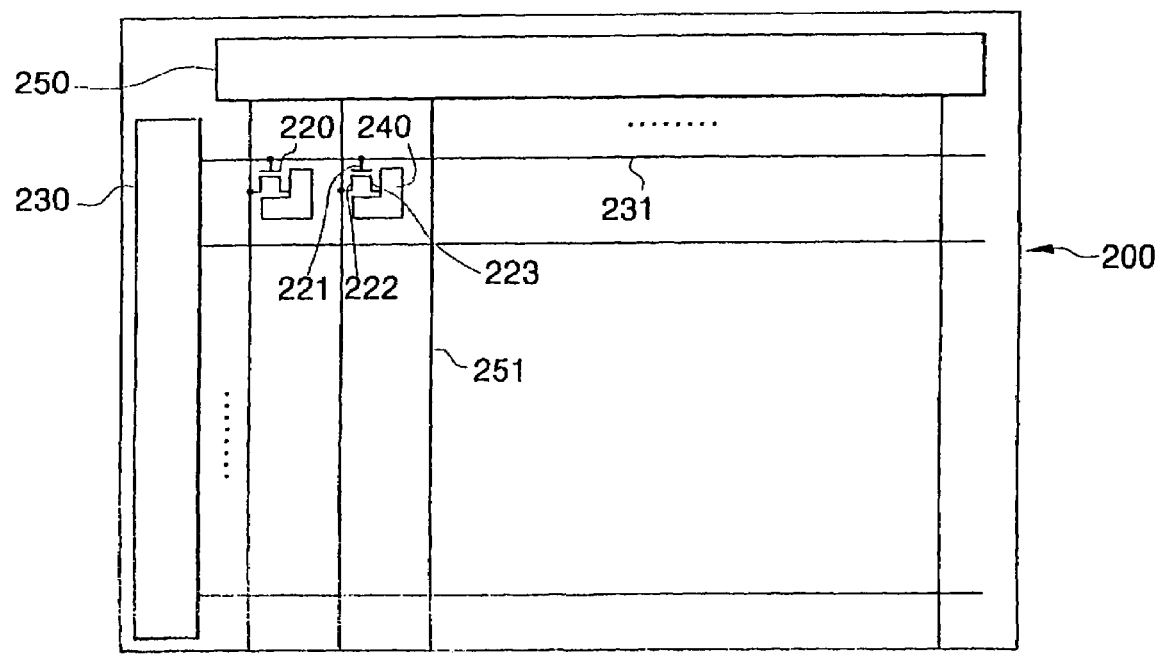

FIG. 1 is a cross sectional view showing a structure of an LCD apparatus according to the present invention. FIGS. 2A and 2B are plan views showing a structure of a color filter substrate and an array substrate shown in FIG. 1.

Referring to FIGS. 1 and 2, an LCD apparatus 500 includes an LCD panel having a color filter substrate 100, an array substrate 200 and a liquid crystal layer 300 disposed between the color filter and array substrates 100 and 200 to display an image.

The color filter substrate 100 includes a first substrate 110, a color filter 120 having RGB (red, green and blue) color pixels, which are color pixels for emitting predetermined colors in response to light and disposed on the first substrate 110, and a BM (Black Matrix) layer 130, which is disposed between the RGB color pixels, for intercepting the light leaked from the RGB color pixels to increase a contrast ratio (C/R). A common electrode 140, comprising an ITO (Indium Tin Oxide) or an IZO (Indium Zinc Oxide), is disposed on the first substrate 100 on which the color filter 120 and the BM layer 130 are disposed.

The array substrate 200 includes a second substrate 210 on which TFTs (Thin Film Transistors) 220 are disposed in a matrix configuration using a thin film process, a gate driving circuit 230 and a data driving circuit 250 for driving the TFTs 220. Hereinafter, an area on which the TFTs 220 are disposed is referred to as a display area (Ds) and an area on which the gate and data driving circuits 230 and 250 are disposed is referred to as a driving area (Dr).

A plurality of gate lines 231 extended in a row direction and arranged in a column direction is disposed on the display area (Ds), and a plurality of data lines 251 extended in the column direction and arranged in the row direction is disposed on the display area (Ds). Each of the TFTs 220 includes gate, source and drain electrodes 221, 222, and 223. The gate electrode 221 of each of the TFTs 220 is connected to the gate lines 231, a source electrode 222 of each the TFTs 220 is connected to the data lines 251 and a drain electrode 223 of each of the TFTs 220 is connected to a pixel electrode 240 comprising the ITO or IZO.

Accordingly, when an electric signal is applied to the gate and data driving circuits 230 and 250, respectively, the gate driving circuit 230 applies a gate driving voltage appropriate to drive the TFTs 220 to the gate lines 231 sequentially selected. When the TFTs 220 are sequentially driven in response to the gate driving voltage, an image signal outputted from the data driving circuit 250 is applied to the pixel electrode 240 connected to a TFT driven by the gate driving voltage after being applied to the data lines 251. Thus, an electric field is generated between the common electrode 140 disposed on the color filter substrate 100 and the pixel electrode 240 disposed on the array substrate 200.

A cell gap maintaining member (hereinafter, referred to as "spacer") 150 is disposed between the color filter and array substrates 100 and 200. The color filter substrate 100 is spaced apart from the array substrate 200 in a predetermined gap by the spacer 150. The spacer 150 may be disposed on the color filter substrate 100 or the array substrate 200. An LCD apparatus in which the spacer 150 is disposed on the color filter substrate 100 will be described as followings.

The spacer 150 is disposed on a non-effective display area in order to maintain an opening ratio (an effective display area/a total area) of the LCD apparatus 500. The display area (Ds) on which the TFTs 220, gate lines 231 and data lines 251 are disposed and the driving area (Dr) are defined as the non-effective display area.

The spacer 150 includes a first spacer 151 disposed on the non-effective display area of the display area (Ds) and a second spacer 152 disposed on the driving area (Dr) and being smaller than the first spacer 151. The second spacer 152 is shorter and narrower than the first spacer 151.

Also, a distance between the second spacer 152 and another second spacer adjacent to the second spacer 152 is narrower than a distance between the first spacer 151 and another first spacer adjacent to the first spacer 151. That is, since the second spacer 152 is disposed on the driving area (Dr) and no liquid crystal layer 300 is in the driving area (Dr), the second spacer 152 does not affect the opening ratio of the LCD apparatus 500 and need to be sparsely spaced. Thus, the second spacer 152 disposed on the driving area (Dr) is denser, or more frequently, than the first spacer 151 disposed on the display area (Ds).

The first spacer 151 has a stripe shape because the first spacer 151 is disposed on the display area (Ds) of the color filter substrate 100, corresponding to the BM layer 130. When the second spacer 152 is viewed from an upper side of the color filter substrate 100, the second spacer 152 may have a dot shape or the same stripe shape to that of the first spacer 151.

When the color filter substrate 100 is combined with the array substrate 200, the common electrode 140 is faced to the pixel electrode 240. A sealant 160 is disposed between seal line areas (SI) on end portions of the color filter and array substrates 100 and 200 to combine the color filter substrate 100 with the array substrate 200.

The liquid crystal layer 300 is interposed between the color filter and array substrates 100 and 200. Accordingly, the electric field generated between the common electrode 140 disposed on the color filter substrate 100 and the pixel electrode 240 disposed on the array substrate 200 varies based on an aligning angle of the liquid crystal layer 300 to control a light transmittance of the liquid crystal layer 300, so a desired image may be obtained.

The LCD apparatus 500 may reduce impact applied to the gate and data driving circuits 230 and 250 with the second spacer 152 disposed on the driving area (Dr). The LCD apparatus 500 may prevent the common electrode 140 (that is disposed on the color filter substrate 100) from being made contact with the gate and data driving circuits 230 and 250 (that is disposed on the array substrate 200) caused by the external impact.

FIGS. 3A to 3F are sectional views showing a method of fabricating the color filter substrate shown in FIG. 1. FIGS. 4A to 4D are perspective views showing the color filter substrate shown in FIGS. 3A, 3B, 3C and 3E, respectively.

Figure 3A:
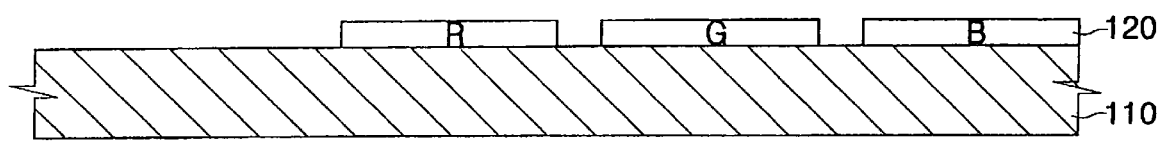
FIGS. 3A to 3H are sectional views showing a method of fabricating the color filter substrate shown in FIG. 1.
Figure 4A:
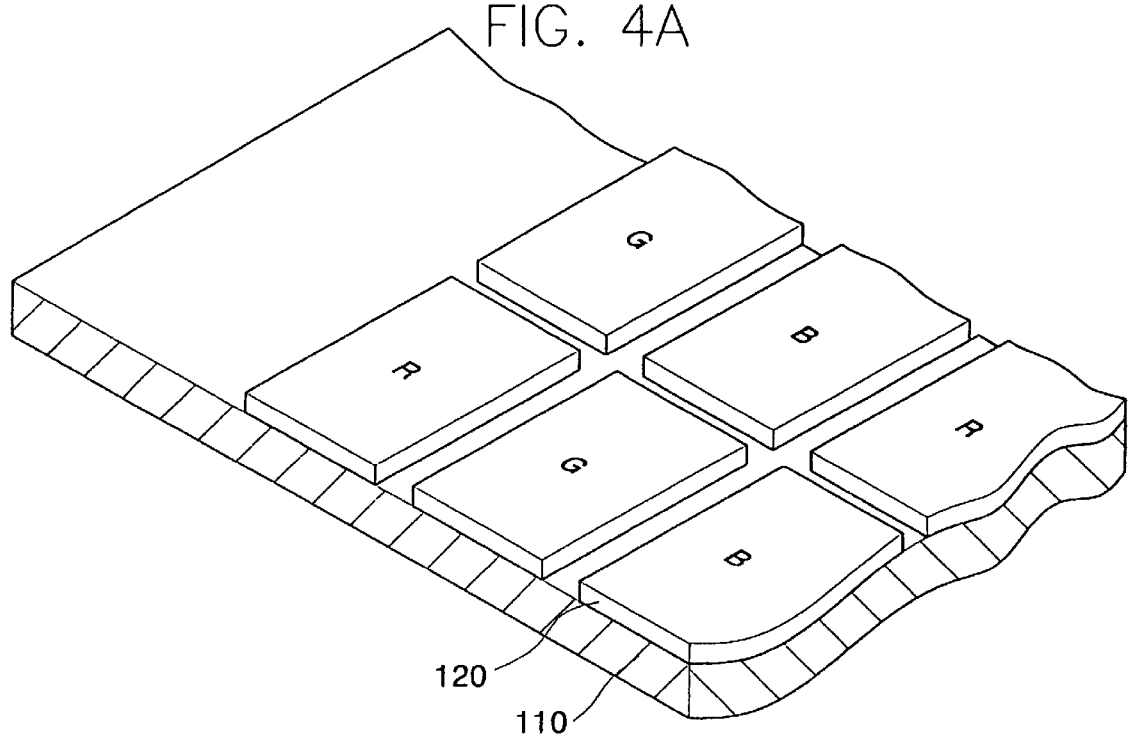
FIGS. 4A to 4D are perspective views showing the color filter substrate shown in FIGS. 3A, 3B, 3C and 3E, respectively.

Referring to FIGS. 3A and 4A, a first photo resist (not shown) having red pigment or red dye is coated on the first substrate 110. A first mask (not shown) on which a pattern corresponding to the R color pixel of the first substrate 110 is formed is disposed on the first substrate 110 on which the first photo resist is coated.

When the first photo resist is reacted to a developer after an exposing process, an area of the first photo resist exposed through the exposing process is stripped. As a result, the R color pixel is formed on the first substrate 110 as shown in FIG. 3A.

In order to form the G color pixel, a second photo resist (not shown) having green pigment or green dye is coated on the first substrate 110 except an area on which the R color pixel is formed. The G color pixel is formed through the same exposing and developing processes to the process to form the R color pixel. Similarly, in order to form the B color pixel, a third photo resist (not shown) having blue pigment or blue dye is coated on the first substrate 110 except areas on which the R and G color pixels are formed. The B color pixel is formed through the same exposing and developing processes to the process to form the R and G color pixels. Thus, the color filter 120 having the R, G and B color pixels is formed on the first substrate 110.

Figure 3B:
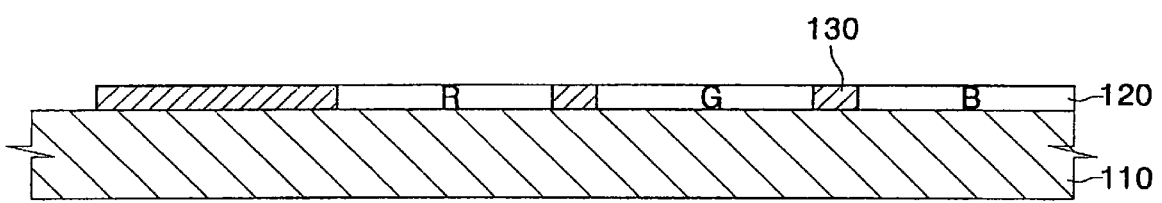
Figure 4B:
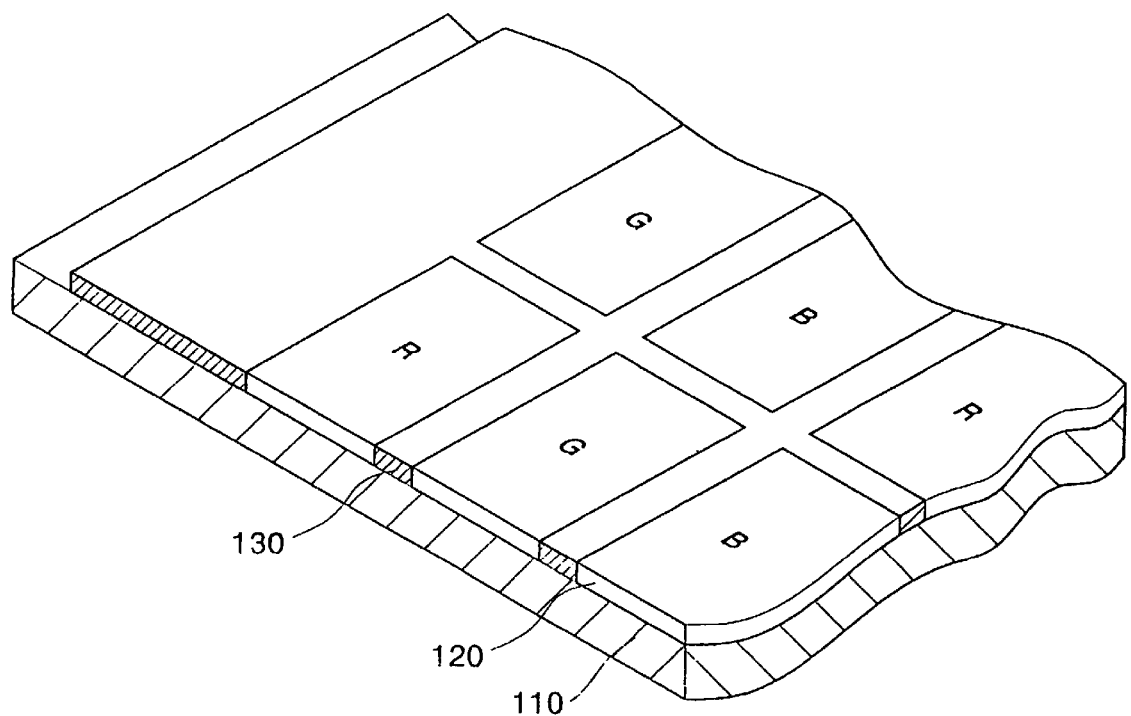

FIG. 3B is a sectional view showing a structure of the black matrix (BM) layer 130 and FIG. 4B is a perspective view showing the structure of the black matrix (BM) layer 130 shown in FIG. 3B.

Referring to FIGS. 3B and 4B, the BM layer 130 is formed on the first substrate 110 on which the color filter 120 is formed. The BM layer 130 is disposed between the R, G and B color pixels, so that the BM layer 130 intercepts the light leaked from the R, G and B color pixels to increase the contrast ratio (C/R). The BM layer 130 is also disposed on the driving area (Dr) to prevent the gate and data driving circuits 230 and 250 from being projected on the display screen of the LCD apparatus 500. The BM layer 130 comprises a chromium oxide ($CrO_2$) or an organic BM. The seal line area (SI) is disposed at the end portion of the first substrate 110.

Figure 3C:
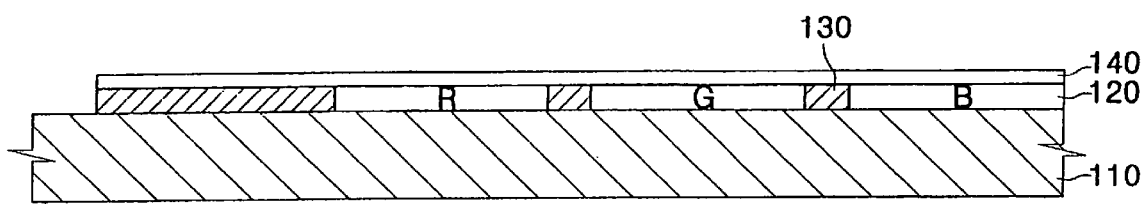
Figure 4C:
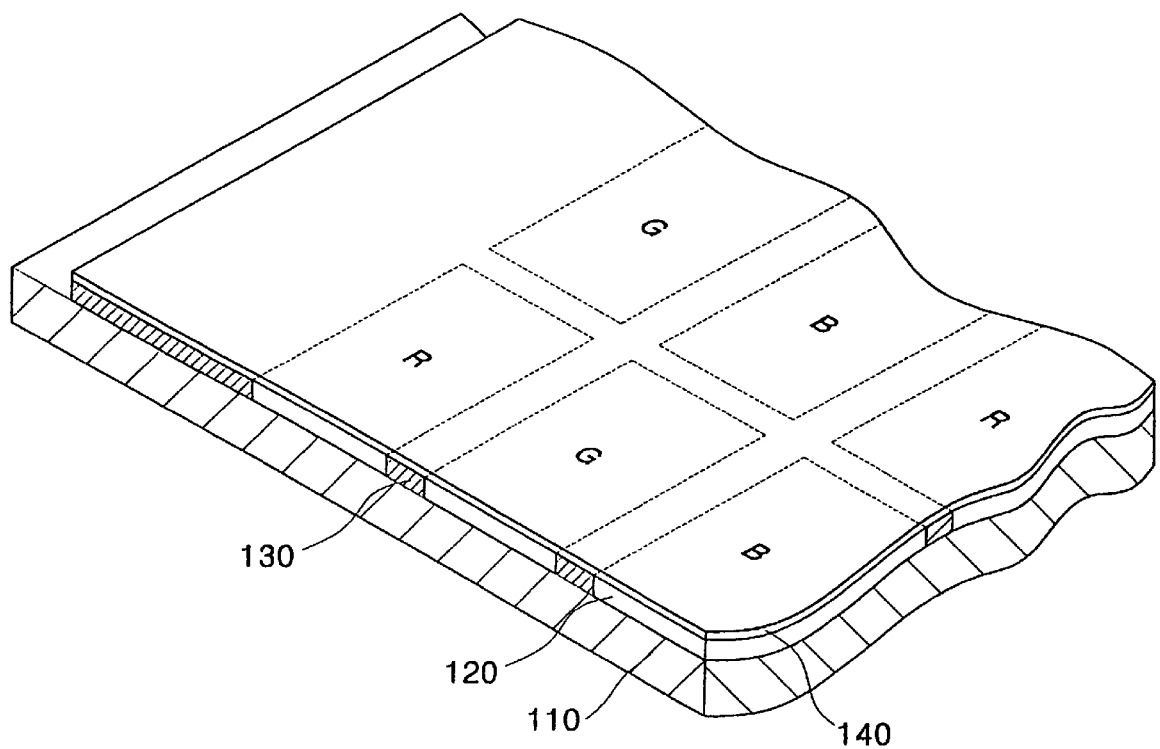

FIG. 3C is a sectional view showing a structure of the common electrode and FIG. 4C is a perspective view showing the structure of the common electrode shown in FIG. 3C.

Referring to FIGS. 3C and 4C, the common electrode 140 having a uniform thickness is formed on the first substrate 110 on which the color filter 120 and the BM layer 130 are disposed. The common electrode 140 comprises the ITO or the IZO.

Figure 3D:
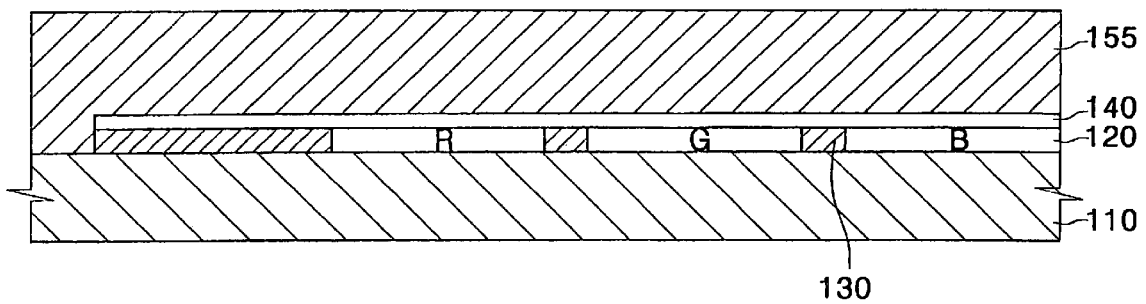
Figure 3E:
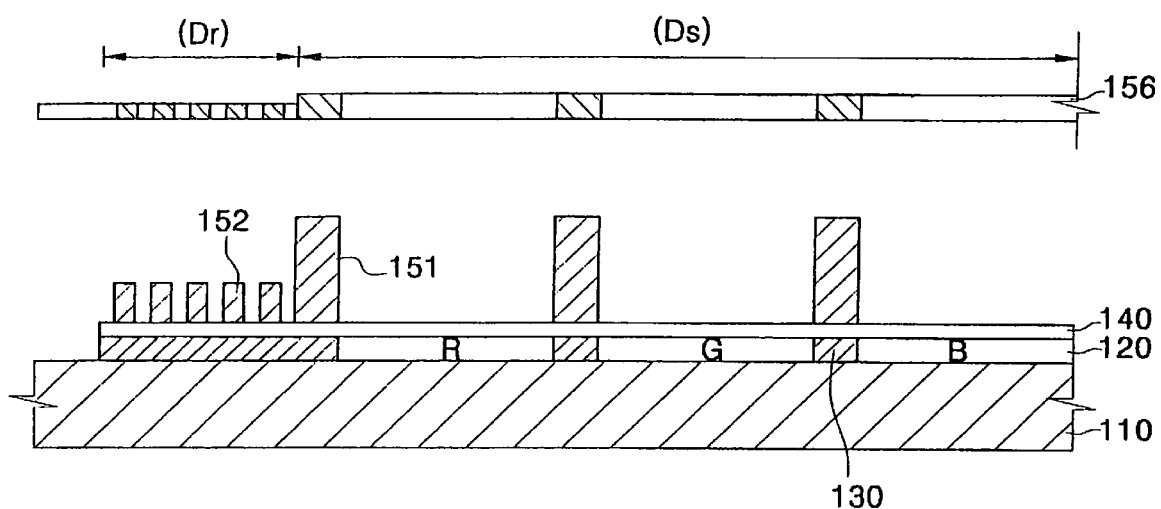
Figure 4D:
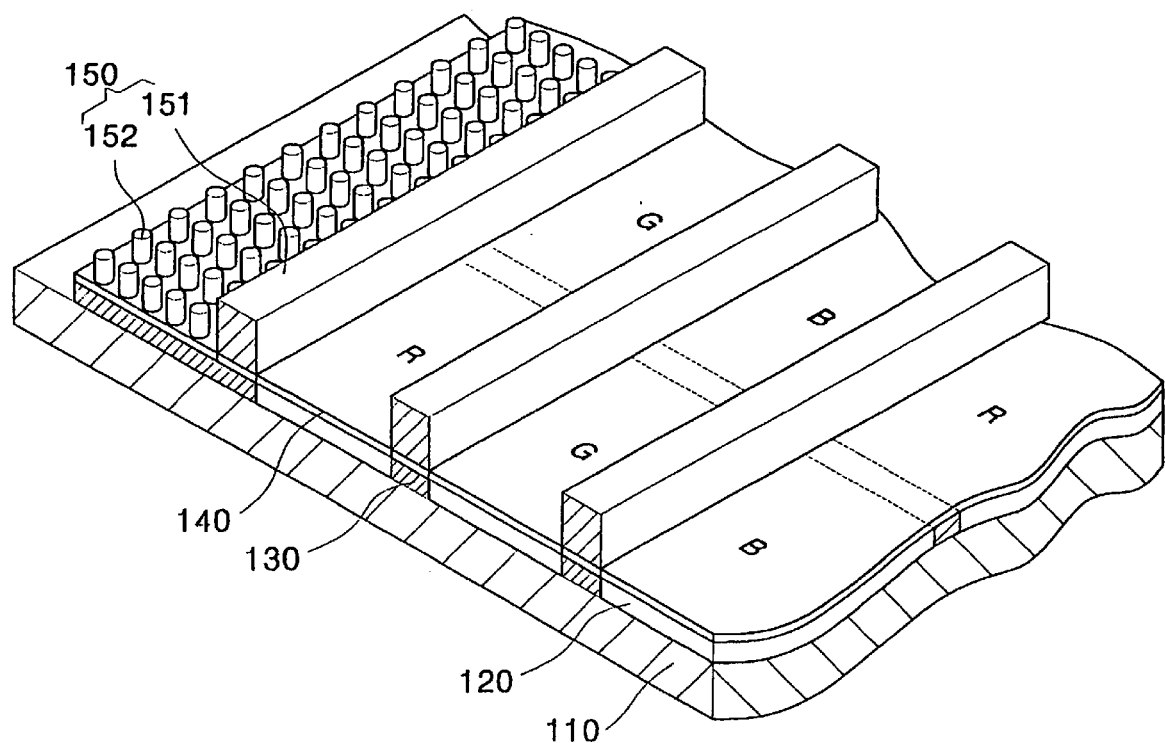

FIG. 3D is a sectional view showing a structure of a photosensitive organic layer, FIG. 3E is a sectional view showing a structure of the spacer and FIG. 4D is a perspective view showing the structure of the spacer shown in FIG. 3E.

Referring to FIG. 3D, a photosensitive organic layer 155 is disposed on the common electrode 140.

As shown in FIGS. 3E and 4D, a second mask 156 having patterns corresponding to the first and second spacers 151 and 152 is disposed on the photosensitive organic layer 155. The photosensitive organic layer 155 is fully exposed on the display area (Ds) except an area on which the first spacer 151 is formed. The photosensitive organic layer 155 is half exposed on an area of the driving area (Dr) on which the second spacer 152 is formed, and fully exposed on a remaining area of the driving area (Dr). The patterns of the second mask 156 corresponding to the first and second spacers 151 and 152 have first and second light transmittances, respectively. The second light transmittance is higher than the first light transmittance.

When the photosensitive organic layer 155 reacts to a developer, the first spacer 151 is formed on the display area (Ds) and the second spacer 152 smaller than the first spacer 151 is formed on the driving area (Dr). The second spacer 152 has a size of about 25% to about 75% of a size of the first spacer 151.

As shown in FIG. 4D, the first spacer 151 has the stripe shape corresponding to that of the BM layer 130 extended in the row direction. The second spacer 152 has a cylinder shape, however, the second spacer 152 may have a triangular pole shape or a square pole shape. Also, the second spacer 152 may have the same stripe shape to that of the first spacer 151.

The second spacer 152 disposed on the driving area (Dr) is denser, or more frequently, than the first spacer 151 disposed on the display area (Ds). This is because the driving area (Dr) on which the second spacer 152 is disposed is not related to an area for displaying an image. Accordingly, the liquid crystal layer 300 does not need to be formed on the driving area (Dr), so that the second spacer 152 may be denser, or more frequently, than the first spacer 151.

Figure 3F:
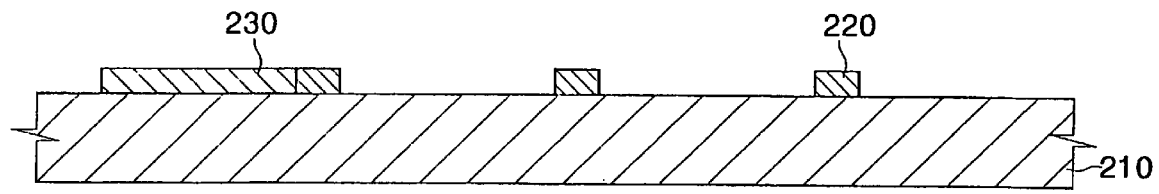

Referring to FIG. 3F, the TFTs 220 is formed with the gate lines (not shown) extended in the column direction and the data lines (not shown) extended in the row direction on the display area (Ds) of the second substrate 210 through a process. The gate driving circuit 230 is formed with the data driving circuit (not shown) on the driving area (Dr) through another process.

Figure 3G:
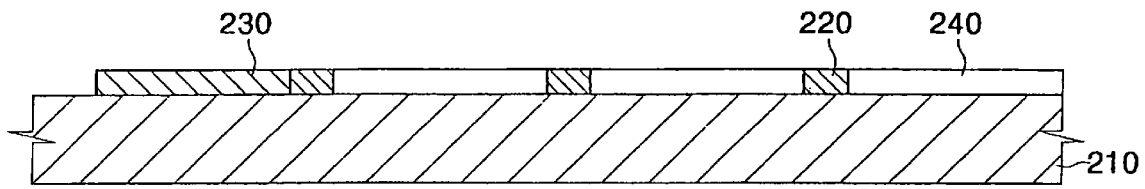

Referring to FIG. 3G, the pixel electrode 240, comprising the ITO or IZO, is formed on the second substrate 210 and connected to the drain electrode (not shown) of the TFTs 220.

Figure 3H:
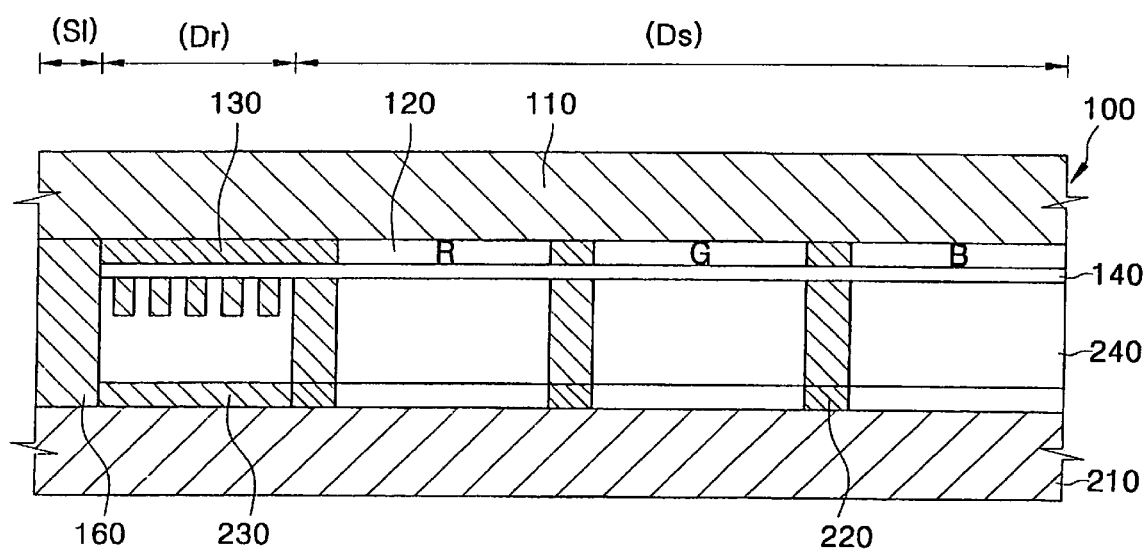

As shown in FIG. 3H, the color filter substrate 100 is combined with the array substrate 200 and the common electrode 140 is faced to the pixel electrode 240. The sealant 160 is formed on the seal line area (SI) to combine the color filter substrate 100 with the array substrate 200.

The first spacer 151 disposed on the color filter substrate 100 maintains the cell gap between the color filter substrate 100 and the array substrate 200. The second spacer 152 disposed on the driving area (Dr) prevents the gate and data driving circuits 230 and 250 of the array substrate 200 from being electrically made contact with the common electrode 140. Although not shown in FIG. 3H, the second spacer 152 disposed on the gate driving circuit 230 may be also disposed on the data driving circuit (not shown in FIG. 3H).

Referring to FIG. 1, the liquid crystal is injected between the color filter substrate 100 and the array substrate 200 to form the liquid crystal layer 300 therebetween, so that the LCD apparatus 500 is completed.

FIGS. 5A to 5G are sectional views showing a method of fabricating a color filter substrate according to another embodiment of the present invention. In FIGS. 5A to 5G, a method of forming a spacer on the color filter substrate will be described in detail.

Figure 5A:
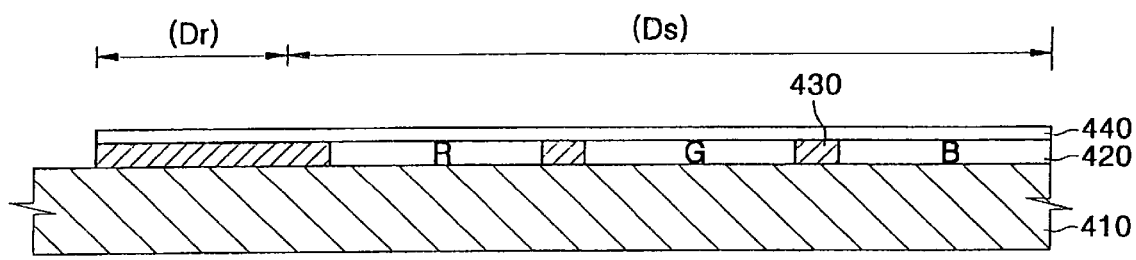

Referring to FIG. 5A, a color filter 420 having RGB color pixels is formed on a first substrate 410 and a BM layer 430. The BM layer 430 is disposed between the RGB color pixels, for intercepting the light leaked from the RGB color pixels to increase a contrast ratio (C/R).

The BM layer 430 is disposed on the display area (Ds) and the driving area (Dr) to prevent the gate and data driving circuits 230 and 250 from being projected on the display screen of the LCD apparatus 500.

A common electrode 440, comprising the ITO or the IZO, is disposed on the first substrate 410 on which the color filter 420 and the BM layer 430 are disposed.

Figure 5B:
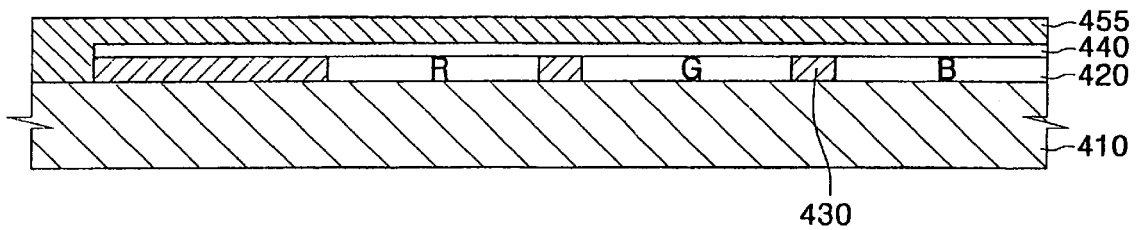

Referring to FIG. 5B, a first photo resist 455 having red pigment or red dye is coated on the first substrate 410 on which the color filter 420, BM layer 430 and common electrode 440 are disposed.

In FIG. 5C, a first mask 456 having a pattern corresponding to first and second R color pixel layers 451 and 452 is disposed on the first substrate 410 on which the first photo resist 455 is coated. When the first photo resist 455 reacts to a developer after exposing the first photo resist 455, an area of the first photo resist 455 exposed through the exposing process is stripped. As a result, the first and second R color pixel layers 451 and 452 are formed on the display and driving areas (Ds and Dr), respectively. The second R color pixel layer 452 is denser, or more frequently, than the first R color pixel layers 451.

Referring to FIG. 5D, a second photo resist 465 having green pigment or green dye is coated on the first substrate 410 on which the first and second R color pixel layers 451 and 452 are formed.

Figure 5E:
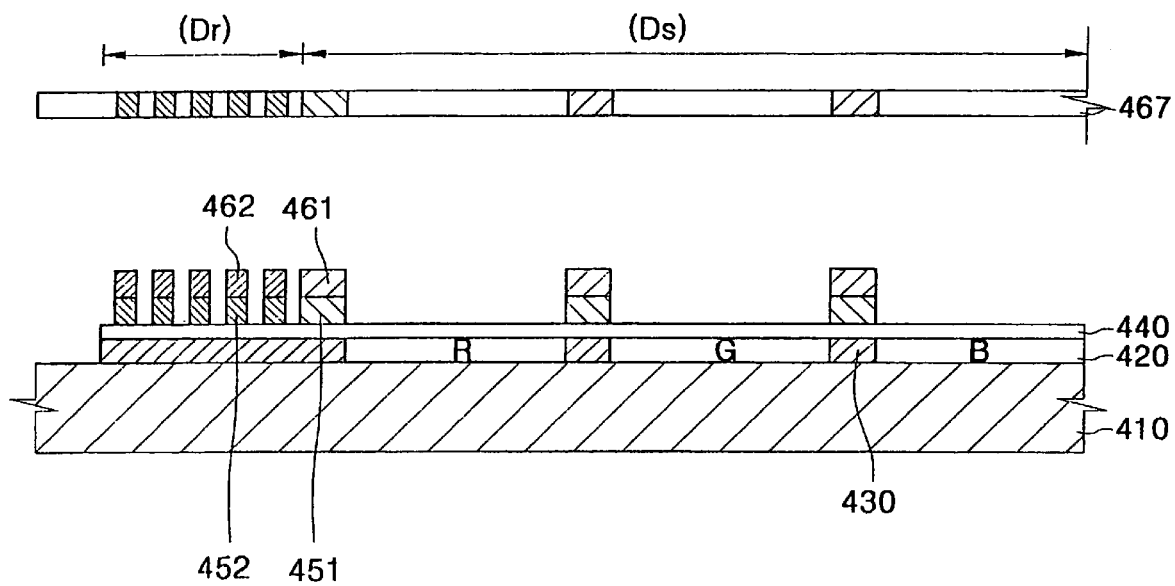

As shown in FIG. 5E, a second mask 467 having a pattern corresponding to first and second G color pixel layers 461 and 462 is disposed on the first substrate 410 on which the second photo resist 465 is coated. When the second photo resist 465 reacts to a developer after exposing the second photo resist 465, an area of the second photo resist 465 exposed through the exposing process is stripped. As a result, the first and second G color pixel layers 461 and 462 are formed on the first and second R color pixel layers 451 and 452, respectively.

Figure 5F:
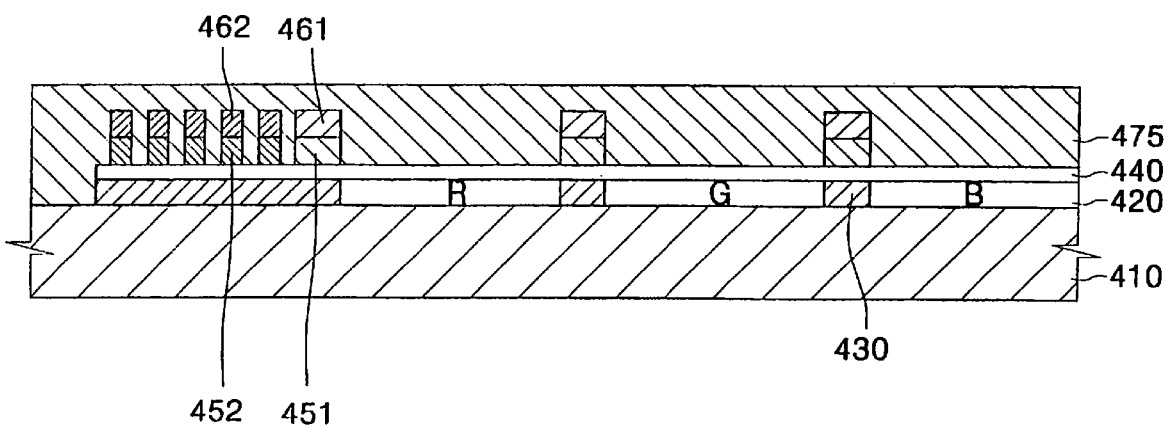

Referring to FIG. 5F, a third photo resist 475 having blue pigment or blue dye is coated on the first substrate 410 on which the first and second G color pixel layers 461 and 462 are formed.

Figure 5G:
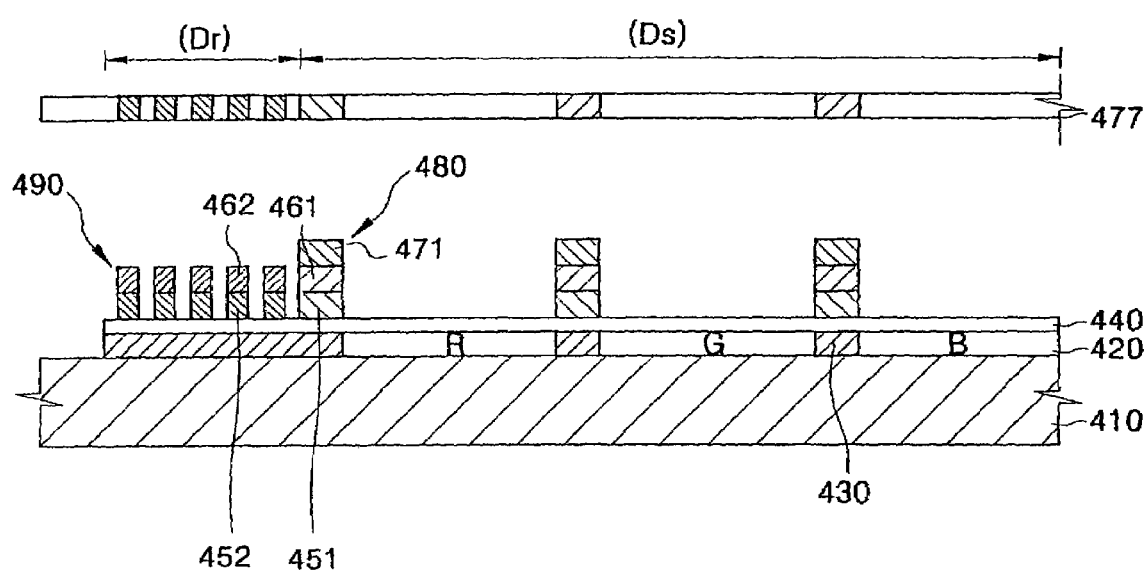

Referring to FIG. 5G, a third mask 477 having a pattern corresponding to a B color pixel layer 471 is disposed on the first substrate 410 on which the third photo resist 475 is coated. When the third photo resist 475 reacts to a developer after exposing the third photo resist 475, an area of the third photo resist 475 exposed through the exposing process is stripped. As a result, the B color pixel layer 471 is formed on the first G color pixel layer 461.

A first spacer 480 having the first R color pixel layer 451, first G color pixel layer 461 and B color pixel layer 471 is disposed on the display area (Ds) and a second spacer 490 having the second R color pixel layer 452 and second G color pixel layer 462 is disposed on the driving area (Dr). The first spacer 480 has a height higher than that of the second spacer 490 because the first spacer 480 is formed to have three layers sequentially deposited. The first spacer 480 maintains a cell gap between the color filter substrate 400 and an array substrate (not shown). The second spacer 490 prevents a gate driving circuit and a data driving circuit of the array substrate from being electrically made contact with a common electrode (not shown).

Although not shown in FIG. 5G, if the first spacer 480 is formed to have two layers sequentially deposited, the second spacer 490 may be formed to have one layer.

Figure 6:
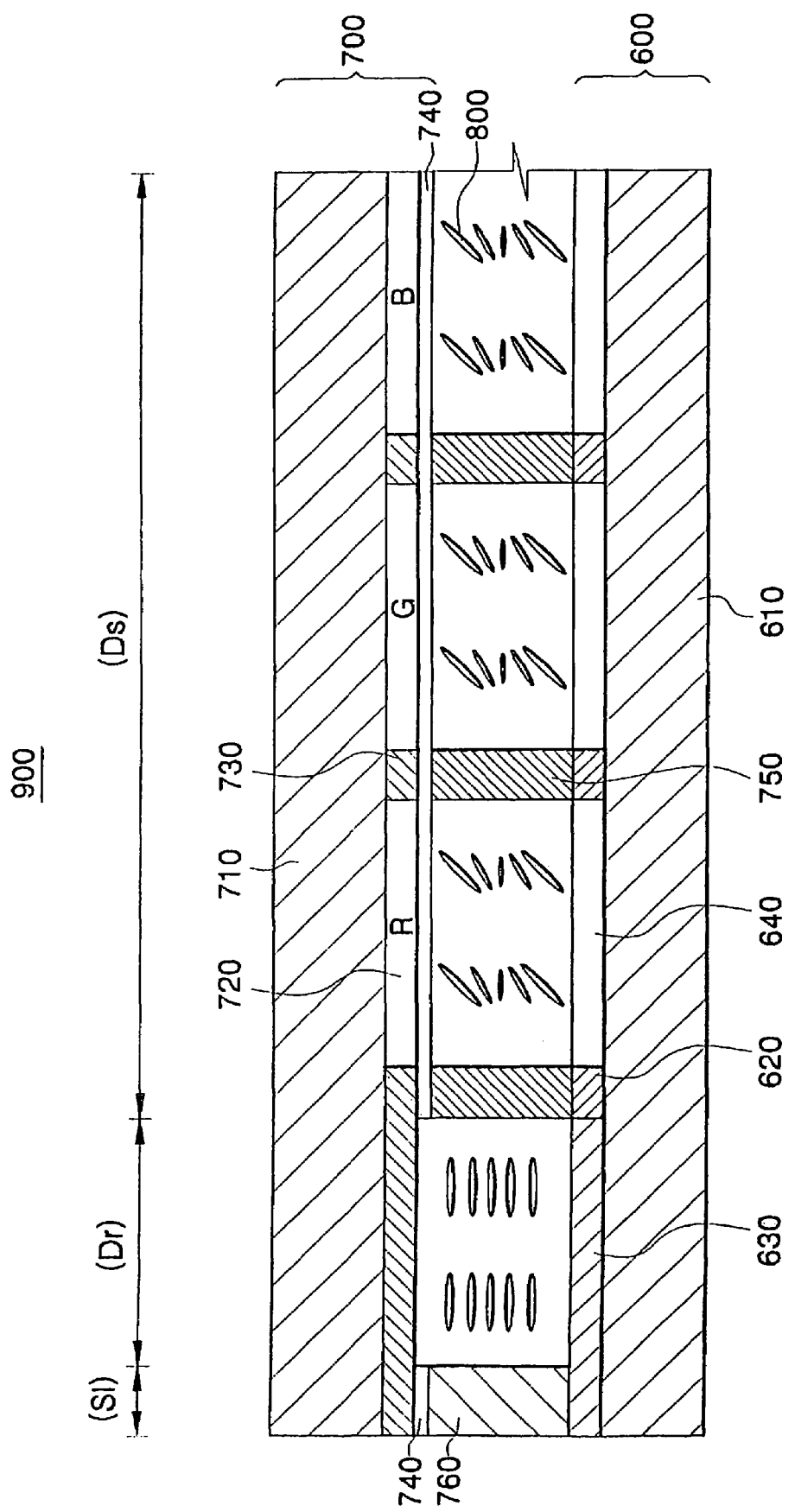
FIG. 6 is a sectional view showing a structure of an LCD apparatus according to another embodiment of the present invention.

FIG. 6 is a sectional view showing a structure of an LCD apparatus according to another embodiment of the present invention.

Referring to FIG. 6, an LCD apparatus 900 includes an LCD panel having an array substrate 600, a color filter substrate 700 and a liquid crystal layer 800 disposed between the array and color filter substrates 600 and 700 to display an image.

The array substrate 600 includes a first substrate 610 on which TFTs 620 are disposed in a matrix configuration using a thin film process a gate driving circuit 630 and a data driving circuit (not shown) for driving the TFTs 620. The TFTs 620 is connected to a pixel electrode 640. Hereinafter, an area on which the TFTs 620 are disposed is referred to as a display area (Ds), an area on which the gate and data driving circuits are disposed is referred to as a driving area (Dr) and an area on which a sealant 760 is disposed is referred to as a seal line area (SI).

The color filter substrate 700 includes a second substrate 710, a color filter 720 having RGB (red, green and blue)

color pixels, which are color pixels for emitting predetermined colors in response to light and disposed on the first substrate 710, and a BM layer 730, which is disposed between the RGB color pixels, for intercepting the light leaked from the RGB color pixels to increase a contrast ratio (C/R). The common electrode 740, comprising an ITO or an IZO, is disposed on the second substrate 710 on which the color filter 720 and the BM layer 730 are disposed.

The color filter substrate 700 is divided into a first area corresponding to the display and seal line areas (Ds and SI) and a second area corresponding to the driving area (Dr). The common electrode 740 is formed only on the first area.

A cell gap maintaining member (hereinafter, referred to as "spacer") 750 is disposed between the array and color filter substrates 600 and 700. The spacer 750 may be disposed on the array substrate 600 or the color filter substrate 700. An LCD in which the spacer 750 is disposed on the color filter substrate 700 will be described.

The spacer 750 is disposed on a non-effective display area in order to maintain an opening ratio of the LCD apparatus 900. That is, the spacer 750 is disposed on an area on which the TFTs 620, gate lines and data lines are disposed.

When the color filter substrate 700 is combined with the array substrate 600, the common electrode 740 is faced to the pixel electrode 640. The sealant 760 is disposed between seal line areas (SI) on end portions of the color filter and array substrates 700 and 600 to combine the color filter substrate 700 with the array substrate 600. The liquid crystal layer 800 is disposed between the color filter substrate 700 and the array substrate 600, so that the LCD apparatus 900 is completed.

According to the LCD apparatus 900, the common electrode 740 is not formed on the driving area (Dr) of the array substrate 600 so as to prevent the common electrode 740 from being made contact with the gate and data driving circuits when an impact is applied to the LCD apparatus 900.

FIGS. 7A to 7I are sectional views showing a method of fabricating the LCD apparatus shown in FIG. 6.

Figure 7A:
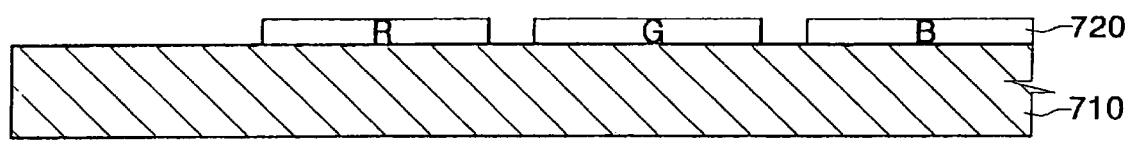
FIGS. 7A to 7I are sectional views showing a method of fabricating the LCD apparatus shown in FIG. 6.

Referring to FIG. 7A, a first photo resist (not shown) having red pigment or red dye is coated on the second substrate 710. A first mask (not shown) having a pattern corresponding to a first R color pixel layer is disposed on the second substrate 710 on which the first photo resist is coated. When the first photo resist reacts to a developer after exposing the first photo resist, an area of the first photo resist exposed through the exposing process is stripped. As a result, the first R color pixel layer is formed as shown in FIG. 7A.

Then, a second photo resist (not shown) having green pigment or green dye is coated on the second substrate 710 except an area on which the R color pixel layer is formed. The same process for forming the R color pixel layer is performed so as to form the G color pixel layer as shown in FIG. 7A.

In order to form the B color pixel layer, a third photo resist (not shown) having blue pigment or blue dye is coated on the second substrate 710 except an area on which the R and G color pixel layer are formed. When the same process for forming the R color pixel layer is performed, the B color pixel layer is formed as shown in FIG. 7A. Accordingly, the color filter 720 having the R, G and B color pixel layers are disposed on the second substrate 710 corresponding to the first area.

Figure 7B:
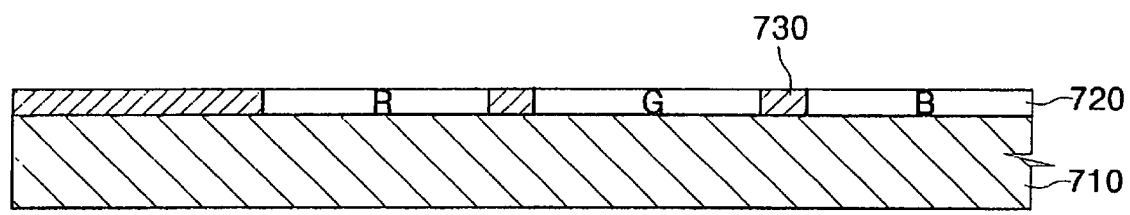

Referring to FIG. 7B, the BM layer 730 is formed on the second substrate 710 on which the color filter substrate 720 is disposed. The BM layer 730 is disposed between the R, G and B color pixel layers and intercepts the light leaked from the R, G and B color pixel layers to increase a contrast ratio (C/R). The BM layer 730 is also disposed on the second area to prevent the gate and data driving circuits from being projected on the display screen of the LCD apparatus 900. The BM layer 730 comprises a chromium oxide $CrO_2$ or an organic BM.

Figure 7C:
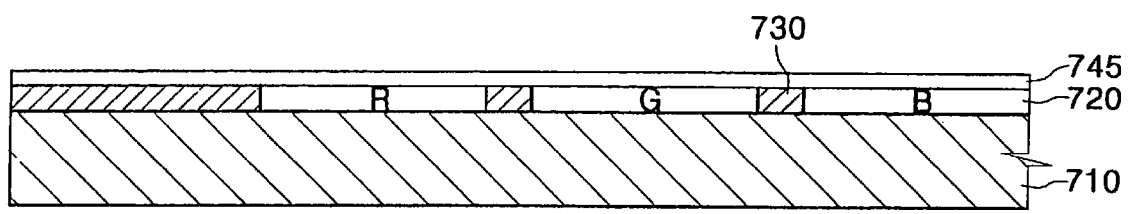

As shown in FIG. 7C, a common electrode layer 745, comprising the ITO or IZO, is uniformly formed on the second substrate 710 on which the color filter 720 and the BM layer 730 are formed.

Figure 7D:
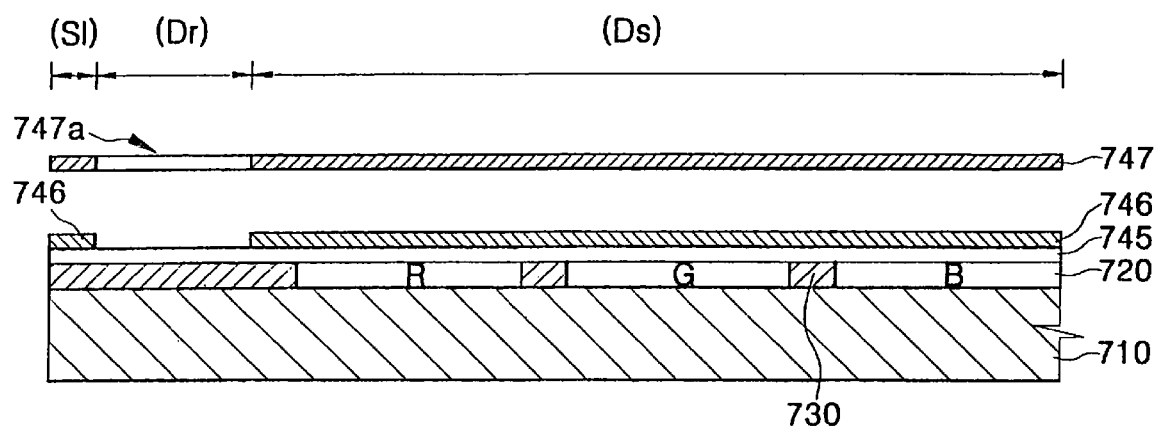

Referring to FIG. 7D, a photo resist layer 746 is deposited on the common electrode layer 745. A second mask 747 having an exposing area corresponding to the second area is disposed on the photo resist layer 746. When the photo resist layer 746 reacts to a developer after exposing the photo resist layer 746 using the second mask 747, the exposed area of the photo resist layer 746 is stripped.

Figure 7E:
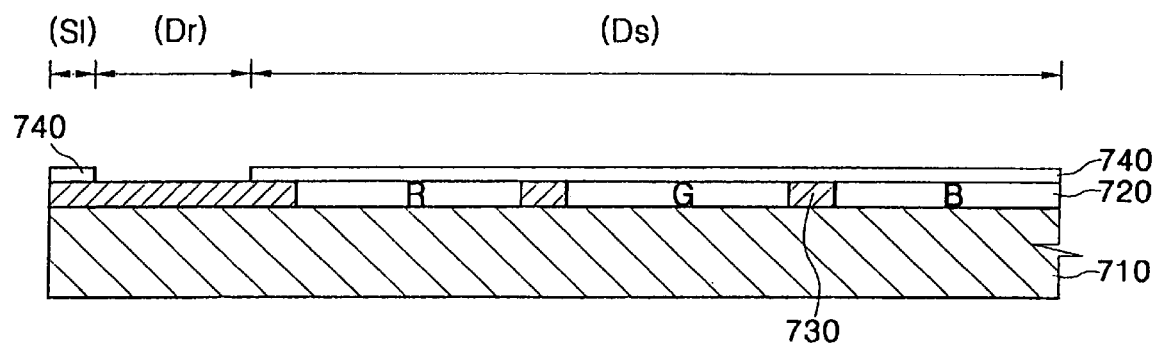

Referring to FIG. 7E, the common electrode layer 745 is reacted to a developer so as to remove the exposed area of the common electrode layer 745. When the photo resist layer 746 is stripped, the common electrode 740 is formed on only the first area.

Figure 7F:
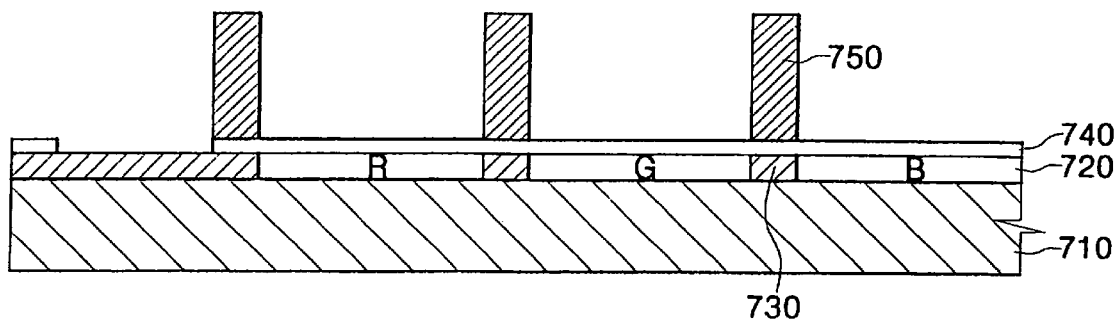

Referring to FIG. 7F, the spacer 750 is formed on an area of the common electrode 740 corresponding to the BM layer 730. The spacer 750 has the stripe shape in order to maintain the cell gap of the LCD apparatus 900, thereby completing the color filter substrate 700.

Figure 7G:
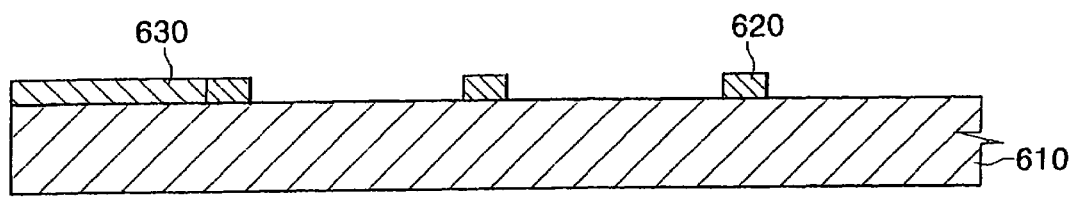

As shown in FIG. 7G, the TFTs 620 are disposed on the display area (Ds) of the first substrate 610 in the matrix configuration, and the gate lines (not shown) extended in the column direction and the data lines (not shown) extended in the row direction are disposed on the display area (Ds). The gate driving circuit 630 and the data driving circuit (not shown) for driving the TFTs 620 are disposed on the driving area (Dr).

Figure 7H:
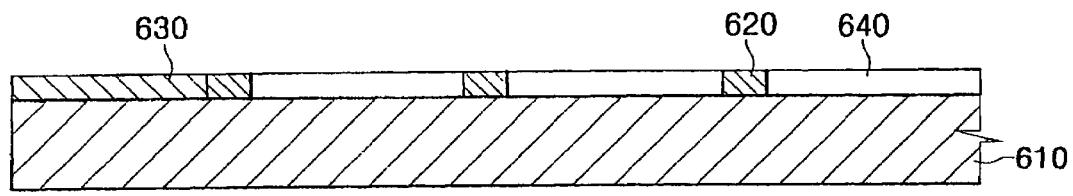

Referring to FIG. 7H, the pixel electrode 640, comprising the ITO or IZO, is formed on the first substrate 610 and the pixel electrode 640 is electrically connected to the drain electrode (not shown) of the TFTs 620, thereby completing the array substrate 600 of the LCD apparatus 900.

Figure 7I:
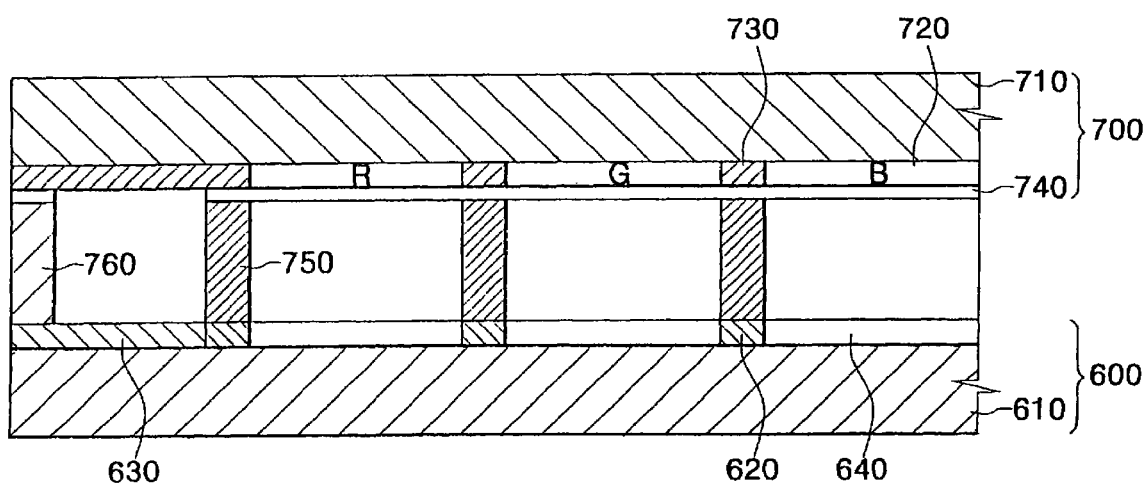

As shown in FIG. 7I, the color filter substrate 700 is combined with the array substrate 600 so that the common electrode 740 is faced to the pixel electrode 640. The sealant 760 is disposed on seal line areas of the color filter and array substrates 700 and 600 to combine the color filter substrate 700 with the array substrate 600.

Again, referring to FIG. 6, the liquid crystal is injected between the color filter substrate 700 and the array substrate 600 to form the liquid crystal layer 800 therebetween, so that the LCD apparatus 900 is completed.

According to the invention, a first spacer for separating a color filter substrate from an array substrate is disposed on a display area of the color filter substrate and a second spacer for protecting gate and data driving circuits is disposed on a driving area of the color filter substrate.

Therefore, when an impact is applied to an LCD panel, the second spacer may prevent a common electrode disposed on the color filter substrate from being made contact with the gate and data driving circuits disposed on the array substrate.

Also, since the second spacer is smaller than the first spacer, it is able to prevent the gate and data driving circuits from being damaged by the second spacer when applying the impact to the LCD panel.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
   a first substrate;
   a transparent electrode disposed on the first substrate;
   a second substrate facing the first substrate;
   a cell gap maintaining member disposed between the first and second substrates to separate the second substrate and the first substrate, the cell cap maintaining member comprising:
      a first cell gap maintaining member disposed on a first area of the transparent electrode corresponding to a display part of the second substrate; and
      a second cell gap maintaining member disposed on a second area of the transparent electrode corresponding to a driving part adjacent to the display part of the second substrate, for protecting the driving part, the first cell gap maintaining member being taller than the second cell gap maintaining member;
   a sealant disposed between the first substrate and the second substrate and corresponding to a seal line area adjacent to the driving part, the sealant combining the first substrate with the second substrate; and
   a buffer layer disposed between the second cell gap maintaining member and the driving part, and between the second cell gap maintaining member and the sealant.

2. The display panel of claim 1, wherein the first and second cell gap maintaining members further comprise a photosensitive organic layer, respectively.

3. The display panel of claim 1, further comprising a color filter having red, green and blue color pixel layers.

4. The display panel of claim 1, wherein each of the first and second cell gap maintaining members comprises at least one layer of red, green and blue color pixel layers.

5. The display panel of claim 1, wherein the first cell gap maintaining member comprises at least two layers of red, green and blue color pixel layers and the second cell gap maintaining member comprises at least one layer of the red, green and blue color pixel layers.

6. The display panel of claim 1, wherein the transparent electrode is disposed on the first substrate except the second area.

7. The display panel of claim 6, wherein the transparent electrode comprises an indium tin oxide or an indium zinc oxide.

8. A display panel comprising:
   a first substrate;
   a transparent electrode disposed on the first substrate;
   a second substrate facing the first substrate;
   a cell gap maintaining member disposed between the first and second substrates to separate the second substrate and the first substrate, the cell can maintaining member comprising:
      a first cell gap maintaining member disposed on a first area of the transparent electrode corresponding to a display part of the second substrate; and
      a second cell gap maintaining member disposed on a second area of the transparent electrode corresponding to a driving part adjacent to the display part of the second substrate, for protecting the driving part, the first cell gap maintaining member being taller than the second cell gap maintaining member; and
   a buffer layer disposed at least between the second cell gap maintaining member and the driving part,
   wherein the buffer layer comprises a liquid crystal layer.

9. The display panel of claim 1, wherein the buffer layer makes contact with a portion of the transparent electrode.

10. The display panel of claim 1, wherein each of the first and second cell gap maintaining members comprises a stripe shape or a dot shape.

11. A display panel comprising:
   a first substrate;
   a transparent electrode disposed on the first substrate;
   a second substrate facing the first substrate;
   a cell gap maintaining member disposed between the first and second substrates to separate the second substrate and the first substrate, the cell cap maintaining member comprising:
      a first cell gap maintaining member disposed on a first area of the transparent electrode corresponding to a display part of the second substrate; and
      a second cell gap maintaining member disposed on a second area of the transparent electrode corresponding to a driving part adjacent to the display part of the second substrate, for protecting the driving part, the first cell gap maintaining member being taller than the second cell gap maintaining member; and
   a buffer layer disposed at least between the second cell gap maintaining member and the driving part,
   wherein a distance between the second cell gap maintaining member and an adjacent second cell gap maintaining member is smaller than a distance between the first cell gap maintaining member and an adjacent first cell gap maintaining member.

12. The display panel of claim 8, wherein the first and second cell gap maintaining members further comprise a photosensitive organic layer, respectively.

13. The display panel of claim 8, further comprising a color filter having red, green and blue color pixel layers.

14. The display panel of claim 8, wherein each of the first and second cell gap maintaining members comprises at least one layer of red, green and blue color pixel layers.

15. The display panel of claim 8, wherein the transparent electrode is disposed on the first substrate except the second area.

16. The display panel of claim 8, wherein the buffer layer makes contact with a portion of the transparent electrode.

* * * * *